United States Patent [19]
Manoukian

[11] 3,783,405
[45] Jan. 1, 1974

[54] LASER HAVING MEANS FOR DEFOGGING THE OPTICAL CAVITY THEREOF

[75] Inventor: Nubar S. Manoukian, San Jose, Calif.

[73] Assignee: Coherent Radiation, Palo Alto, Calif.

[22] Filed: Feb. 4, 1972

[21] Appl. No.: 223,602

[52] U.S. Cl............... 331/94.5, 55/102, 250/106 R
[51] Int. Cl............................................. H01s 3/22
[58] Field of Search..................... 331/94.5; 250/42, 250/106; 55/102

[56] References Cited
UNITED STATES PATENTS

| | | | |
|---|---|---|---|
| 3,101,412 | 8/1963 | Scott-Maxwell | 250/106 R |
| 3,562,664 | 2/1971 | Rigden et al. | 331/94.5 |
| 3,619,811 | 11/1971 | Kaiser et al. | 331/94.5 |

FOREIGN PATENTS OR APPLICATIONS 722,933  2/1955  Great Britain.......................... 55/102

Primary Examiner—Ronald L. Wibert
Assistant Examiner—R. J. Webster
Attorney—Karl A. Limbach et al.

[57] ABSTRACT

In a laser, having a lasing medium and having an optical resonator and wherein there is a space or cavity between the lasing medium and the mirrors forming the optical resonator, means is provided for removing contamination particles, such as dust and fog from the cavity region in the path that the reflected coherent light beam passes. This is accomplished by providing a radioactive source for electrostatically charging the contamination particles and then removing the charged particles from the path of the light beam by, for example, an electrical field.

15 Claims, 3 Drawing Figures

LASER HAVING MEANS FOR DEFOGGING THE OPTICAL CAVITY THEREOF

BACKGROUND OF INVENTION

Many lasers include a space or cavity located between the lasing medium and the mirrors forming the optical resonatoir of the laser. For example, in a gaseous laser, a gas, the active medium, is hermetically sealed within a discharge tube and is then placed between a pair of mirrors forming the optical resonator of the laser. In operation, the gas or gasses within the discharge tube are energized to create the condition commonly referred to as inverted population of energy levels. As the atoms, ions or molecules, as the case may be, decay to lower energy levels the resulting light energy emitted is reflected by the optical resonator which is axially aligned with the discharge tube in which the light is amplified.

In the area between the lasing medium and the mirrors forming the optical resonator structure, it frequently occurs that dust, fog and other contaminating particles accumulate. Thus, in the example of a gaseous ion laser, these contamination particles build up between the discharge tube and the mirrors of the resonator. Since many gaseous ion lasers include a pair of windows, typically at Brewster's angle to the direction of the reflected laser beam, which form a part of the discharge tube, the particular area of contamination buildup is in the cavity region between the Brewster windows and the mirrors of the optical resonator.

The existence of the contaminating particles results in decreased transmission of light between the mirrors of the optical resonator. This results in reduced power and can eventually result in complete failure of the laser to emit any light.

It has been found that there are two major sources of contaminating particles in the cavity region. The first is water vapor or "fog". It is believed that this fog occurs as a result of condensation of water vapor from the atmosphere around ionized gaseous molecules which are formed due to ultra-violet light generated by the laser itself. The problem of fogging appears to be more prevalent where the ambient atmospheric conditions are characterized by high humidity. Another source of contamination is the dust which circulates throughout the atmosphere.

Many attempts have been made to eliminate the contaminating particles from the cavity regions of the laser. One approach is to hermetically seal the cavity region. However, this is not satisfactory because minute vibrations are then transmitted from the discharge tube to the mirrors forming the optical resonator. This results in noise in the output light beam.

Another approach is to continuously provide the area with a clean dry stream of air. However, this results in the formation of dirt on the surfaces of the mirrors and of the resonator and the Brewster windows, where provided. This causes the light reflected within the laser to be significantly reduced. The same undesirable results have been found to occur even in a closed type recirculation system.

In one application a desiccant was provided in the cavity region. However, this did not prove to be successful because there was insufficient convection currents to adequately cleanse the area.

Other attempted solutions have included the use of a heater to dissipate the fog. This is not satisfactory because the high temperatures introduced within the laser cause misalignment of the mirrors and also do not solve the dust problem. Also, an ultra-violet filter was introduced within the optical resonator. This works satisfactorily to get rid of the fog but has an adverse effect on the output mode and also does not eliminate the dust problem.

SUMMARY OF THE INVENTION

In accordance with the invention, means for dispersing contaminating particles suspended in the atmosphere in the cavity region of the laser located generally between the mirrors forming the optical resonator and the active lasing material is provided. In particular, the dispersing means moves the contaminating particles from at least that portion of the cavity through which the light beam, reflected between the mirrors of the optical resonator, passes.

The contaminating particles are electrostatically charged by means of radioactive emissions from a radioactive source located in the vicinity of the cavity. The charged contamination particles are then removed from the area through which the beam passes by, for example, an electrical field which attracts the charged particles to the pole having the opposite polarity to that of each of the charged particles.

In the preferred embodiment of the invention the radioactive material is enclosed within a contamination or dust shield which connects and encloses a portion of the area between the mirrors of the optical resonator and the ends of the capsule enclosing the active laser material. In the example of a gaseous laser, the dust shield including the radioactive material extends from the Brewster windows of the discharge tube to the respective mirrors of the optical resonator.

DESCRIPTION OF THE PREFERRED EMBODIMENTS

Figure 1:
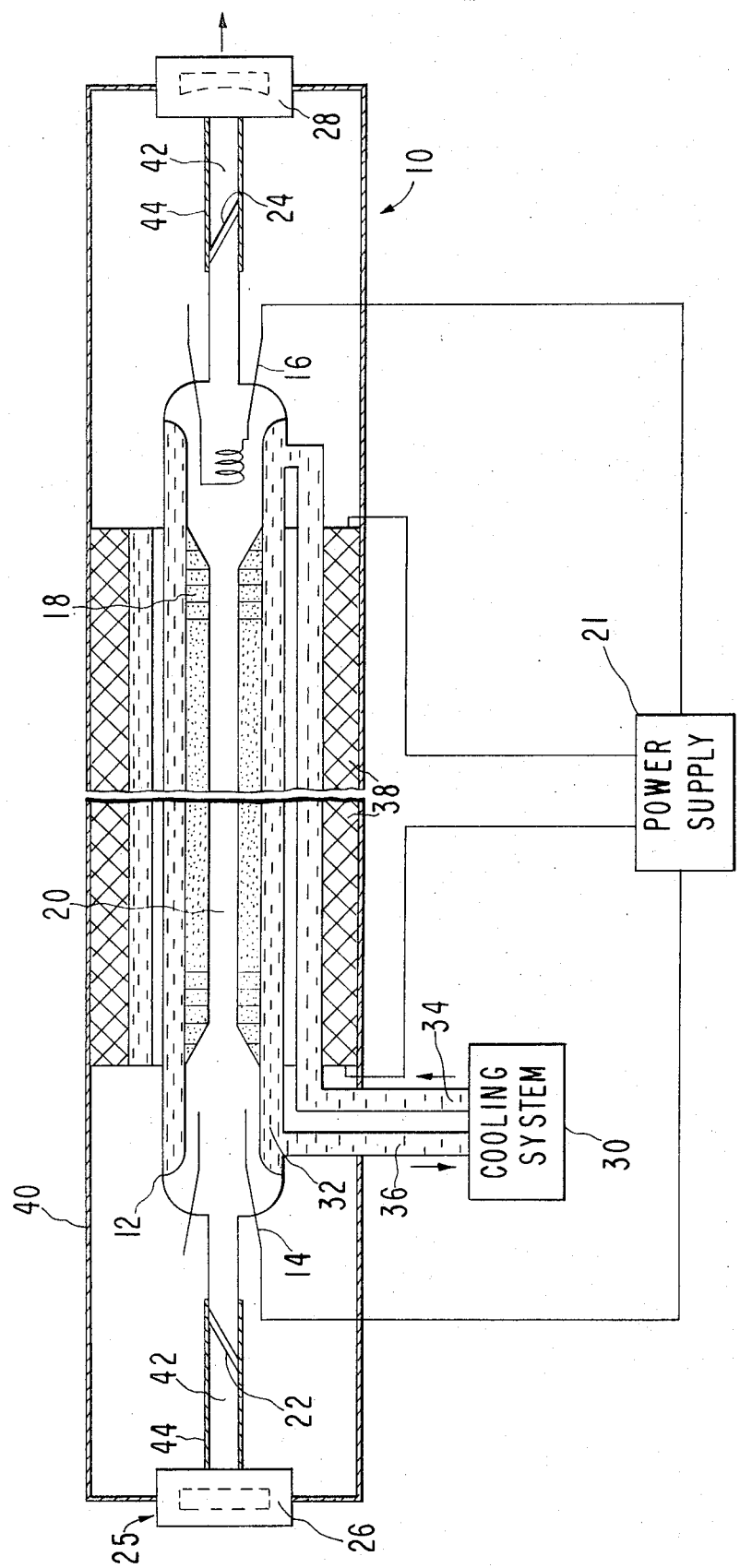
FIG. 1 is a schematic representation of one laser embodiment employing the present invention.

Illustrated schematically in FIG. 1 is a laser 10. For purposes of describing the invention, the laser depicted is a gaseous ion laser. Thus, it includes a high current gas discharge tube or chamber 12 including an anode 14, cathode 16 and a bore structure 18, located centrally thereof and defining an arc discharge path 20 as shown. The arc discharge is established by applying a voltage from a power supply 21 across the anode 14 and cathode 16. The gas chamber 12 is sealed and contains a gas such as argon or krypton or other suitable gas. The gas is the active lasing medium.

The anode and cathode are concentric and permit passing of an optical beam created within the gas chamber to pass through windows 22 and 24 arranged at Brewster's angle to the path of the internally reflected coherent light beam.

The arc discharge causes the gases within the gas chamber 12 to be ionized and excited to high energy levels and as these ions decay to lower energy states radiation is emitted in a manner well known to those skilled in the art. By providing an optical resonator structure 25 which includes a first mirror 26 which is substantially totally reflecting and a second mirror 28 which is approximtely 97 – 98 percent reflecting, the resulting radiation is amplified in a manner also well known to those skilled in the laser art and an output is provided through the mirror 28. For a more detailed description of an optical resonator structure, reference is made to co-pending U.S. Pat. application, Ser. No. 842,956 by Wayne S. Mefferd and James L. Hobart, entitled "Laser Alignment Apparatus", filed July 18, 1969, and assigned to the same assignee as the present invention.

Since the operation of the laser is at very high temperatures, in the vicinity of 1,000°C., a cooling system 30 is provided which includes a cooling jacket 32 surrounding the gas chamber. Water enters in through one tube 34 into the cooling jacket 32 and returns to the cooling system through tube 36. A solenoidal electromagnet 38 surrounds the gas chamber 12 and provides an axial magnetic field. The function of the field is to increase the power output by confining and thereby increasing the ion density without lowering the electron energy enough to degrade the laser excitation. The magnetic field also decreases the formative time lag in arc initiation by the same mechanism. The solenoid 38 is energized from the power supply 21.

The entire laser assembly, including the resonator structure 25 and the discharge structure 18 is enclosed by a jacket or cover 40.

Each of the regions between the Brewster windows 22 and 24 and the mirrors 26 and 28 respectively of the optical resonator structure 25 define a space or cavity 42. As previously explained, this area is filled with air and often becomes contaminated with particles such as dust and water vapor or "fog". The latter is particularly prevalent where the ambient air environment has a high relative humidity. Contamination or dust shields 44 enclose and connect the Brewster windows 22 and 24 with the mirrors 26 and 28 of the optical resonator structure. As explained above, these shields are not hermetically connected between the discharge tube and the mirrors because vibrations generated within the discharge tube would then be transmitted to the mirrors and noise in the output beam of the laser would be created. Thus, although the dust shields tend to reduce the amount of flow of atmosphere in the area enclosed by the shield, it does not completely prevent the circulation of air, and hence dust and fog, in the region through which the laser beam passes.

Figure 2:
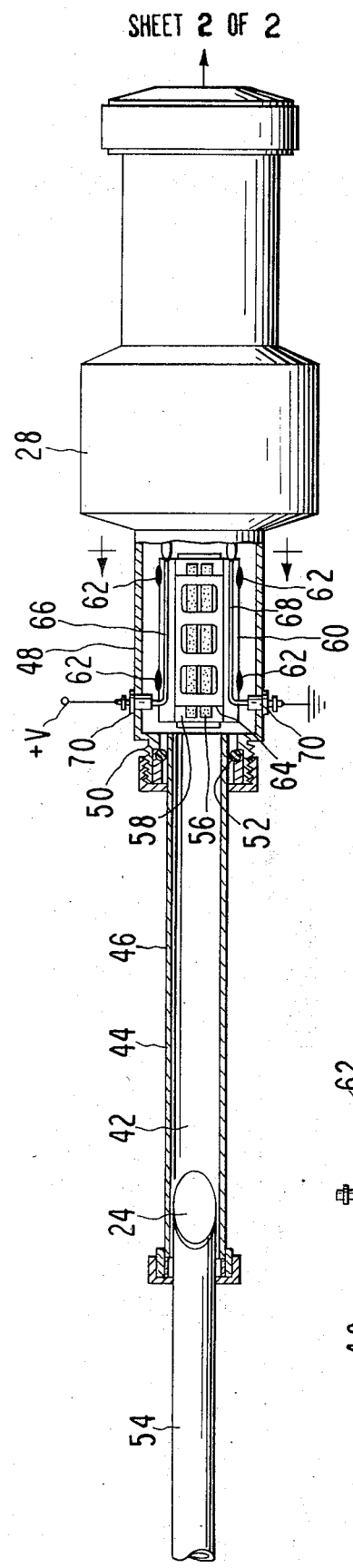
FIG. 2 is a detailed elevational drawing, partially in section, of a part of an actual laser employing the present invention.
Figure 3:
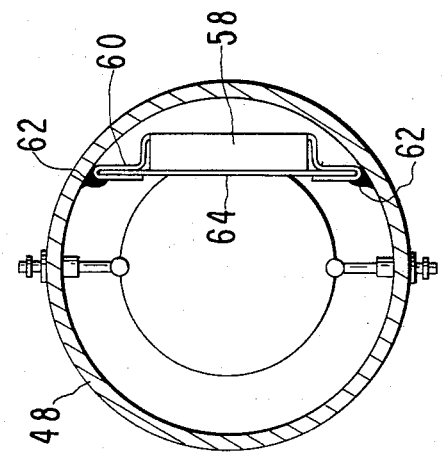
FIG. 3 is a cross-sectional view of that part of the laser shown in FIG. 2 in the direction indicated by the arrows.

Reference is now made to FIGS. 2 and 3 which illustrate the details of a part of an actual laser which utilizes the subject invention. For purposes of illustration, only one of the two cavity portions of the laser is depicted therein. The dust shield 44 includes a tubular glass section 46 and an ionizing chamber 48. The latter is secured at one end to the mirror support assembly 28 which forms one part of the optical resonator 25. The glass tube 46 is secured to the ionizing chamber 48 by any suitable means such as the threaded arrangement 50. Suitable sealing means such as an O-ring 52 is provided to reduce the circulation of air therethrough.

The other end of the glass tube 46 is secured to one end of the discharge tube 54. This part of the discharge tube 54 includes the Brewster window 24. Again, any suitable means may be employed to attach the glass tube 46 to the end 54 of the discharge tube.

In accordance with the invention, a source of radioactive radiation 56, enclosed in a capsule 58, is mounted within the ionizing chamber 48 by means of an adhesive such as epoxy at several points 62 to the inside walls of the ionizing chamber 48. Preferably, the ionizing chamber 48 is made of aluminum.

The radioactive element 56 is covered at the open side of the capsule 58 by a protective grid 64 which is held in place by a clip 60 which forms part of the capsule 58. The purpose of this grid is to prevent the solid radioactive material 56 from being touched or handled. To further protect the user, the radioactive material is sealed between a silver base and a layer of gold (not shown).

As previously explained, dust particles and fog within the cavity 42 are electrostatically charged by dense isotope radiation from the radiation source 56. To remove the charged particles from the region 42 through which the laser beam passes, two electrodes 66 and 68 extend axially along the length of the chamber 48 and an electrical field is created between the electrodes in a direction transverse to the path of the laser beam. The charged dust and fog particles are swept away by the field to the electrode of opposite polarity where they collect.

It has been found that a voltage differential of 250 volts is sufficient to sweep away or disperse the charged particles. The electrodes are electrically insulated from the walls of the chamber 48 by means of teflon insulator inserts 70.

Polonium-210 is a suitable source of radiation. Polonium is harmless unless ingested or inhaled. Alpha radiation emitted from the polonium is low, about 40 microcuries. Although alpha rays travel rapidly through air, they lack the power to penetrate the skin. The effective life of the radiation is about two years. In that time, enough of the radioactivity will have decayed so that the radioactive element must be replaced.

It has been found that any contaminating particles present in the cavity 42 will be dispersed within a period of time of about 5 minutes to 12 hours, depending upon the initial amount of the contaminating particles.

Although the invention has been shown and described in a gaseous ion laser, the present invention is equally applicable to any laser having an active medium and an optical resonator and wherein there is an air space located between the laser medium and the mirrors forming the optical resonator.

What we claim is:

1. Laser apparatus comprising
   a. a sealed discharge chamber containing at least one gas;
   b. means for energizing said at least one gas to at least one excited state, an excited state being characterized by an inverted population;
   c. broad band optical resonating means comprising a first substantially totally reflecting mirror located axially of one end of said discharge chamber and a second partially reflecting mirror located axially of the other end of said discharge chamber, said partially reflecting mirror thereby providing an optical output resulting from the depopulation of said at least one gas; and
   d. means for dispersing particles suspended in the cavity region of the laser located generally between each of the mirrors forming the resonating means and the respective ends of the discharge chamber and through which the reflected coherent light passes, said means comprising
  i. a source of radioactive material providing radioactive emissions within said cavity region to electrically charge said particles, and
  ii. means for attracting said charged particles away from the cavity region through which the light reflected within said optical resonator passes.

2. Laser apparatus as in claim 1 wherein said attracting means comprises an electric field extending substantially transversely across the path of the reflected light for at least a portion thereof.

3. Laser apparatus as in claim 1 wherein said discharge tube includes a pair of windows at opposite ends thereof wherein light passing within said resonator enters and exits through said windows.

4. Laser apparatus as in claim 3 including a shield extending axially from each of said windows to the respective mirrors forming said resonator cavity, said shield being sealed to reduce the free circulation of air therethrough.

5. Laser apparatus as in claim 4 wherein said radioactive material is secured to said shield.

6. Laser apparatus as in claim 5 wherein said attracting means comprises an electric field.

7. Laser apparatus as in claim 6 wherein said electric field is created by applying a voltage across a pair of electrodes secured to said shield.

8. Laser apparatus as in claim 1 wherein said radioactive material comprises radioactive polonium.

9. Laser apparatus as in claim 3 wherein said windows are situated at Brewster's angle relative to the path of the reflected light.

10. In a laser having a lasing medium, means for energizing said lasing medium to an excited condition characterized by an inverted population, optical resonating means comprising a pair of axially aligned mirrors, one of which is only partially reflective and wherein an ambient atmosphere filled cavity exists between at least one of said mirrors and said lasing medium, and wherein the improvement comprises:
  a. means for dispersing contaminating particles suspended in said cavity at least in the region through which coherent light reflected between said mirrors passes, said dispersing means comprising
  b. a source of radioactive material providing radioactive emissions within said cavity to charge said contaminating particles therein, and
  c. means for attracting said charged particles away from the cavity region through which said reflected light passes.

11. Laser apparatus as in claim 10 wherein said attracting means comprises an electric field extending substantially transversely across the path of the reflected light for at least a portion thereof.

12. Laser apparatus as in claim 10 including a shield enclosing at least a part of said cavity, said shield extending from said mirror of said resonator to said lasing medium, and wherein said shield is sealed to reduce the free circulation of air therethrough.

13. Laser apparatus as in claim 12 wherein said radioactive material is secured to said shield.

14. Laser apparatus as in claim 13 wherein said attracting means comprises an electric field created by applying a voltage across a pair of electrodes secured to said shield.

15. Laser apparatus as in claim 14 wherein said radioactive material comprises radioactive polonium.

* * * * *